INVENTORS
PEDRO W. KAGEORGE
GILFORD E. UDEN
John D. Haney
ATTY.

United States Patent Office 3,370,814
Patented Feb. 27, 1968

3,370,814
AIRCRAFT DEICING SHOE
Pedro W. Kageorge, Cuyahoga Falls, and Gilford E. Uden, Akron, Ohio, assignors to The B. F. Goodrich Company, New York, N.Y., a corporation of New York
Filed June 23, 1966, Ser. No. 559,787
9 Claims. (Cl. 244—134)

This invention relates to aircraft deicing equipment and more particularly to an improved inflatable shoe or "boot" adapted for attachment to an airfoil to retard the accumulation of ice.

Existing pneumatic deicing equipment includes a deicing shoe having a series of resilient inflatable tubes covering an airfoil, and an air supply system for alternately inflating and deflating the tubes to flex local regions of exterior surface of the shoe on the airfoil. This flexing action progressively shatters ice layers as they may form on the exterior surfaces of the shoe and the broken ice particles are blown off by the airstream across the airfoil.

Icing conditions ordinarily exist only for a relatively small part of the total aircraft flight time. During ice-free periods, when the deicing equipment is not in use, it is important to maintain the exterior surface of the shoes completely smooth because these surfaces serve as airfoils. Irregularities on these surfaces not only provide a poor appearance, but also can seriously reduce aircraft performance by creating unwanted air turbulence.

Prior to the present invention, in an effort to maintain the tubes or distensible passages of the deicing shoes flat when they are not in service, the tubes or passages have been either vented to atmosphere, or they have been positively evacuated by communicating the tubes with a vacuum source. Neither of these techniques, however, has been reliable for assuring complete evacuation and flattening of the tubes. Quite often some regions of the tubes tend to flatten and close before other regions, entrapping air in the tubes which forms objectionable ridges or bumps along the exterior surface of the shoe. The use of a large number of evacuation or venting ports along the entire length of the tubes minimizes such air entrapment but adds to the cost and weight of the shoes and the capacity of the air supply system needed to operate or evacuate them.

Another proposal to avoid entrapping air in the tubes has been to provide ridges along the interior walls of the tubes which are intended to prevent complete flattening of the tubes and accordingly provide continuous passages through which all the air may be evacuted. These ridges, however, have themselves created surface irregularities on the shoes which are almost as objectionable as the trapped air pockets. Moreover, such ridges materially increase the thickness and weight of the shoes.

According to this invention, a pneumatic deicing shoe is provided having inflatable distensible passages designed for complete air evacuation so that when deflated, its exterior surface is free from irregulatries and forms a smooth airfoil contour. This improved shoe structure is especiallly suitable for every long deicing shoes in that all regions of the shoe can deflate easily and efficiently. Moreover, the improved shoe structure is both lighter in weight and thinner than the corresponding prior art equipment for the same service conditions.

We have found that complete evacuation and flattening of the inflatable tubes may be accomplished merely by interposing between the interior surfaces of the tubes a layer of very short closely grouped flexible fibers of overall uniform thickness. These fibers mat together and collectively prevent complete closure and direct contact between and opposing internal surfaces of the tubes when the latter are deflated, but have interstices through which residual air in the tubes may be vented or pumped from the tubes. By distributing the fibers uniformly, the external surface of the tubes is smooth and regular when the tubes are flattened.

The fibers may be distributed through the interior of the tubes in various ways, such as by flocking one or both interior wall surfaces of the tubes or by attaching fabric containing such fibers inside the tubes. The most satisfactory and preferred way of lining such tubes is to make at least one wall of the tube itself of a highly napped fabric, the nap side forming the interior surface of the tube. A tricot fabric which is stretchable with its outside surface coated with a suitable elastic polymer to render it elastic and airtight, and with the fuzzy nap on the opposite interior side is quite satisfactory for the distensible wall of the tubes.

Deicing shoes embodying the foregoing fibrous interior surface may be made with individually formed tubes, or they may be made by laminating the foregoing napped fabric with other layers of rubber and rubber treated fabrics, and then stitching through the lamination to define the inflatable tube regions. Ordinarily inflatable tubes for deicing shoes have been made individually with the tubes of generally uniform width and the shoes are disposed with the tubes extending lengthwise along the airfoil. In these improved deicing shoes, the stitching to define the tubes may be made in parallel lines of desired, or the stitching lines may intersect somewhat like an old-fashioned quilt. Preferably large loose stitching is used to permit some inflation air flow laterally across the stitching from one pocket or tube to the next. Stitched deicing boots are less expensive than those made with individual tubes and they usually may be thinner and of lighter weight, and they are capable of operation with existing style air supply systems.

The accompanying drawings illustrate by way of example, a stitched deicing shoe made according to and embodying this invention.

Figure 2:
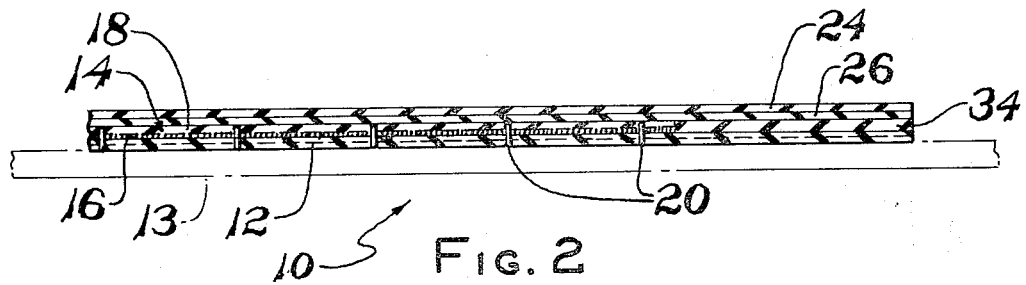
FIGURE 2 is a partial cross-section of the deicing shoe along the line 2—2 of FIGURE 1 when the shoe is fully collapsed either during a deicing cycle or when the deicing equipment is not being operated.
Figure 3:
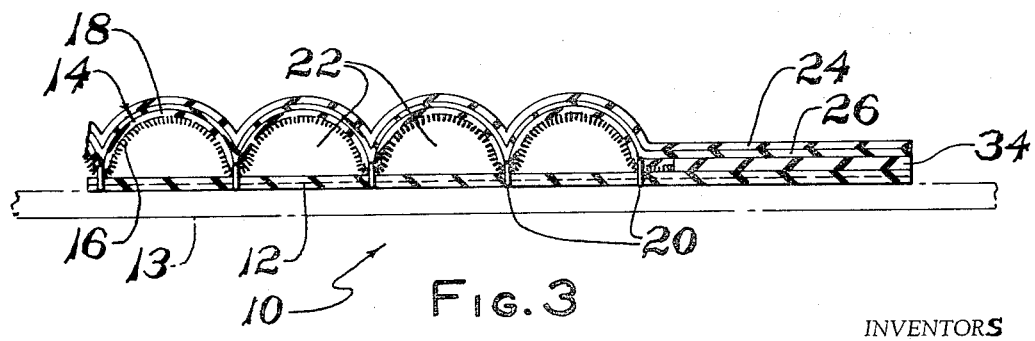
FIGURE 3 is a partial cross-section like FIGURE 2 but showing deicing shoe when fully inflated during the deicing cycle.

The preferred deicing shoe 10 has an inner ply 12 which is adapted for attachment directly to an airfoil 13 indicated in chain dotted lines in FIGURES 2 and 3. Ply 12 is preferably a square woven textile fabric which is coated on both sides with a suitable rubber compound to make this ply air impervious. A ply 14 of tricot fabric overlays ply 12. The side of ply 14 directed toward ply 12 has a heavy nap 16, and on its opposite side there is a rubber coating 18.

Figure 1:
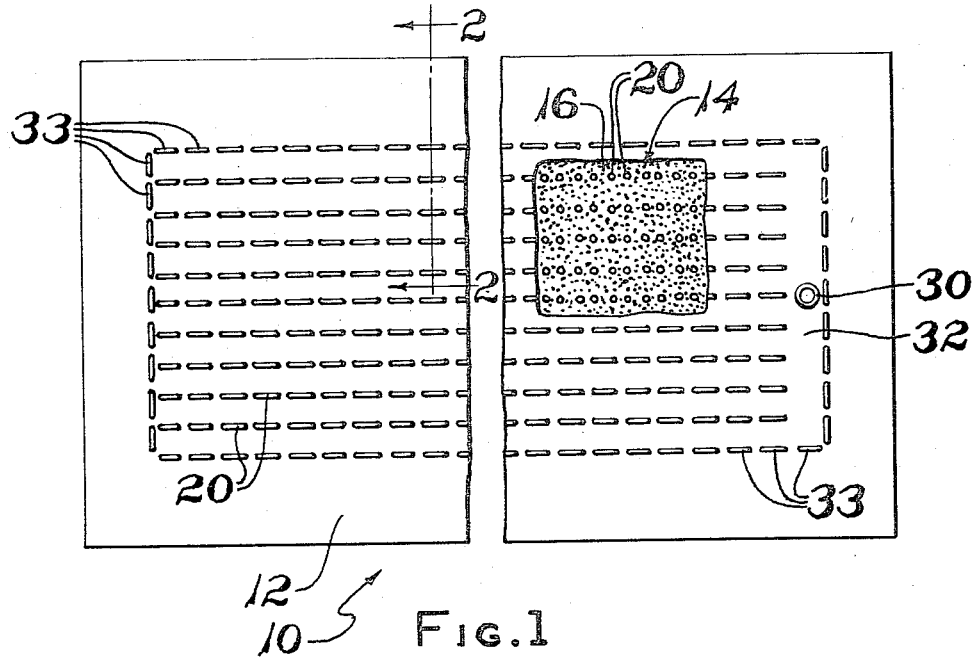
FIGURE 1 is a plan view of the airfoil side of the improved deicing shoe.

In the preferred construction, the napped ply 14 is sewed to the inner ply 12 by a series of stitches 20 so that a series of parallel "tubes" or inflatable passages 22 are formed lengthwise along the shoe as shown in FIGURE 1. The stitching 20 need not be in parallel rows but can be arranged in other patterns if desired. The stitching interconnects ply 14 and ply 12 much like the stitching of an old fashioned quilt.

The outside surface of the deicing shoe is covered by an exterior rubber gum ply 24 which is a resilient rubber compound (preferably a neoprene rubber) which is resistant to wind and rain erosion. A rubber gum ply 26 is used in the preferred construction to aid the bonding of exterior rubber ply 24 to the rubber coating 18 of napped ply 14.

The inflation passages 22 may be communicated to an air pressure source (not shown) and to a vacuum source or vented to atmosphere depending on the type of valving used in the air supply system by a port 30 in a manifold section 32 which is formed between inner ply 12 and outer ply 14 between the right end of the stitching 20 and the peripheral stitching 33 as shown in FIGURE 1.

The nap 16 of ply 14 covers substantially the entire area of the stitching 20. The marginal areas of ply 14 are rubber covered on both sides and are adhered to the corresponding marginal areas of the adjoining plies to form an airtight margin 34 around the stitched center area of the shoe.

The sewing or stitching 20 are locked stitches. The number of stitches per inch may be varied according to the desirability of permitting crossflow of air laterally through the stitching. If large loose stitching is used, to increase crossflow of inflation air, the manifold area 32 may be reduced in size or even eliminated.

In a typical installation, ply 12 of the deicing shoe 10 is adhered flat against the surface of an air foil 13 by a suitable adhesive of which many different kinds are well known in the art, and a source of inflation air (not shown) is communicated to port 30. In the inflation cycle, air enters port 30, and flows through manifold 32 and into passages 22 thereby stretching the outer plies 14 and 24 into the fully inflated position shown in FIGURE 3. When the air pressure is subsequently vented to atmosphere or to a vacuum source (part of the air supply system not shown), the inflated passages 22 tend to resiliently contract and flatten because of the elasticity of the fabric 14 and the rubber coverings on the outside surface.

When deflated, as in FIGURE 2, the nap 16 prevents complete closure of the inflation passages but leaves them appearing flat and smooth surfaced as shown in FIGURE 2. The nap 16 provides a multitude of tiny passages for the residual air to flow to the port 30 to provide proper evacuation.

The interior surface of ply 12 may also be napped, or flocked or otherwise covered with fibers, like nap 16 of fabric ply 14.

We claim:
1. Apparatus for preventing the accumulation of ice on an airfoil, said apparatus comprising:
   (a) an inner ply adapted for attachment to an airfoil;
   (b) an extensible elastic outer ply overlying said inner ply;
   (c) a napped surface on the interior face of at least one of said plies;
   (d) means for fastening local areas of said plies to each other to form a series of inflation passages between said plies; and
   (e) means for communicating said passages with a pressure source to elastically distend the portions of the outer ply between said fastened areas.

2. Apparatus according to claim 1 wherein said fastening means includes stitching connecting said outer ply to a said inner ply.

3. Apparatus according to claim 2 and further comprising an exterior rubber ply overlying and adhered to said outer ply to protect said outer ply from erosion by rain and the like.

4. Apparatus according to claim 2 wherein said stitching is loose to provide for the passage of air laterally of the stitching between adjoining inflation passages.

5. A deicing shoe in which a series of distensible passages are adapted for alternate inflation and deflation to shatter ice films accumulating on the outside surface of the shoe, and characterized in that each passage has between its interior surfaces a layer of very short closely grouped flexible fibers, the layer being of substantially uniform thickness throughout the passage, and the fibers collectively preventing complete closure of the passages and providing interstices through which air may be withdrawn to insure substantially complete evacuation and smooth flattening of the passages on deflation.

6. A deicing shoe according to claim 5 and characterized in that said fibers are the napped surface of a fabric on the interior of said passages.

7. A deicing shoe according to claim 6 characterized in that said napped fabric forms at least one wall of said distensible passages.

8. A deicing shoe according to claim 7 characterized in that said napped fabric forms the outside distensible wall of said passages.

9. A deicing shoe in which a series of distensible passages are adapted for alternate inflation and deflation to shatter ice films accumulating on the outside surface of the shoe, and characterized in that these passages are formed by two plies, one of which is substantially extensible, and a series of longitudinal stitches sewing the plies together, said stitches having a minimum frequency of penetrations through said plies so that said stitches form a relatively open stitching pattern to permit the lateral flow of air between adjacent passages and to reduce the possibilities of tearing failures from a substantial perforated pattern on said plies.

References Cited

UNITED STATES PATENTS

| | | | |
|---|---|---|---|
| 2,421,621 | 6/1947 | Hunter et al. | 244—134 |
| 2,585,285 | 2/1952 | Tonge et al. | 244—134 X |
| 2,957,662 | 11/1960 | Hess | 244—134 |
| 3,085,925 | 4/1963 | Schliekelmann | 244—134 X |

MILTON BUCHLER, *Primary Examiner.*

B. BELKIN, *Assistant Examiner.*